(12) United States Patent
Ohnishi

(10) Patent No.: US 7,705,956 B2
(45) Date of Patent: Apr. 27, 2010

(54) DISPLAY DEVICE

(75) Inventor: Harunori Ohnishi, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 353 days.

(21) Appl. No.: 11/648,832

(22) Filed: Jan. 3, 2007

(65) Prior Publication Data

US 2007/0165178 A1    Jul. 19, 2007

(30) Foreign Application Priority Data

Jan. 18, 2006   (JP)   ............................. 2006-010042

(51) Int. Cl.
*G02F 1/1339*   (2006.01)
(52) U.S. Cl. ...................................... 349/153; 349/190
(58) Field of Classification Search ......... 349/153–154, 349/189–190
See application file for complete search history.

(56) References Cited

U.S. PATENT DOCUMENTS 7,230,669 B1   6/2007   Tashiro et al.

7,535,538 B2 *   5/2009   Yamada et al. .............. 349/153

FOREIGN PATENT DOCUMENTS

| JP | 5-70129 A | 3/1993 |
|---|---|---|
| JP | 6-186582 A | 7/1994 |
| JP | 2000-352717 A | 12/2000 |
| JP | 2003-005184 | 1/2003 |

* cited by examiner

*Primary Examiner*—Dung T. Nguyen
(74) *Attorney, Agent, or Firm*—Birch, Stewart, Kolasch & Birch, LLP

(57) ABSTRACT

The display device includes: a wiring substrate 31 having wiring lines and switching elements thereon; a counter substrate 33 held so as to oppose the wiring substrate 31; a display medium layer 35 provided between the wiring substrate 31 and the counter substrate 33; and a sealing section 37 surrounding the display medium layer 35, the sealing section 37 being formed of a sealing material which contains a photocurable resin. The display device has a display region 40 in which a plurality of pixels are included. The sealing material contains light-scattering particles for scattering light which cures the photocurable resin. The counter substrate 33 has a light shielding layer 39 thereon, the light shielding layer 39 surrounding the display region 40. The sealing section 37 is formed within a region shaded by the light shielding layer 39. Deterioration of reliability due to curing failures of the sealing material is suppressed.

12 Claims, 3 Drawing Sheets

*FIG.4A* *FIG.4B*
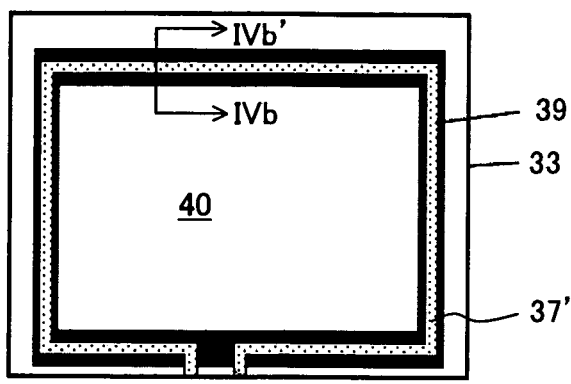
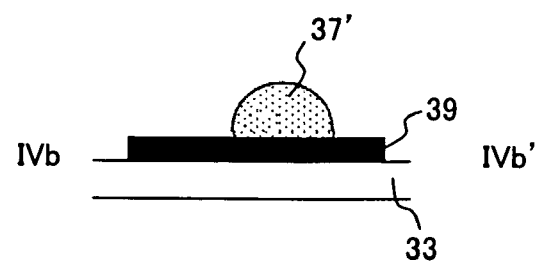

DISPLAY DEVICE

BACKGROUND OF THE INVENTION

1. Field of the Invention

The present invention relates to a display device, and more particularly to a display device that is formed by using a sealing material which contains a photocurable resin.

2. Description of the Related Art

In a liquid crystal display device, a sealing material is used to enclose liquid crystal between a pair of substrates. As an adhesive agent which is contained in the sealing material, thermosetting resins (e.g., epoxy resin) have conventionally been used mainly. In the recent years, however, UV curable resins are also widely used in the place of thermosetting resins. Since a UV curable resin has a curing temperature which is lower than the curing temperature of a thermosetting resin, use of a sealing material which contains a UV curable resin (UV curable type sealing material) provides an advantage of reducing the thermal strain which may occur in the substrates during the curing process.

FIGS. 1A and 1B are schematic diagrams illustrating a commonly-used construction of an active matrix type liquid crystal display device which is constructed by using a UV curable type sealing material. FIG. 1A is a plan view; and FIG. 1B is a cross-sectional view taken along line Ib-Ib' in FIG. 1A.

A liquid crystal display device 100 includes: a TFT substrate 1 on which switching elements (e.g., thin film transistors (TFTs)) and wiring lines are provided; a counter substrate 3 which opposes the TFT substrate 1; a liquid crystal layer 5 which is provided between the TFT substrate 1 and the counter substrate 3; and a sealing section 7 which surrounds the liquid crystal layer 5.

The liquid crystal display device 100 has a display region 10 in which a plurality of pixels are arrayed. In the display region 10 of the TFT substrate 1, not only TFTs but other necessary circuit elements are also formed, e.g., a plurality of pixel electrodes and gate bus lines and source bus lines (not shown). In the display region 10 of the counter substrate 3, color filters which are arrayed correspondingly to the pixels, a counter electrode (not shown), and the like are formed. In a display device of such a construction, a desired signal charge(s) is given to a selected pixel electrode(s), whereby the directions of liquid crystal molecules in the liquid crystal layer 5 (which is interposed between the pixel electrodes and the counter electrode) are controlled, thus performing display. On the other hand, the sealing section 7 is formed in a region (referred to as a "non-display region") 20 outside the display region 10. The non-display region 20 includes the following features: an inlet section 8 through which a liquid crystal material is injected into the region surrounded by the sealing section 7; and a closing section 9 which closes the inlet section. Thus, the sealing section 7, the inlet section 8, and the closing section 9 together serve to enclose the liquid crystal material between the TFT substrate 1 and the counter substrate 3. Furthermore, in the non-display region 20 of the counter substrate 3, a light shielding layer (not shown) for preventing unnecessary light from entering the display region 10 is provided. Peripheral circuitry such as driving circuits may also be formed in the non-display region 20 of the TFT substrate 1.

In the liquid crystal display device 100 shown in FIG. 1, the sealing section 7 is generally formed by the following method. First, on either one of the TFT substrate 1 or the counter substrate 3, a predetermined pattern (seal pattern) is formed by using a UV curable type sealing material. Next, the TFT substrate 1 and the counter substrate 3 are attached to each other. Thereafter, the sealing material is irradiated with ultraviolet which cures the sealing material, whereby the sealing section 7 is obtained.

However, in the above method, ultraviolet irradiation is performed after the TFT substrate 1 and the counter substrate 3 are attached together. Therefore, during the irradiation, the seal pattern may be partially shaded by the wiring lines on the TFT substrate 1 and/or the light shielding layer on the counter substrate 3, and so on. This makes it difficult to allow the entire seal pattern to be uniformly irradiated with ultraviolet, thus resulting in a problem in that a portion of the sealing material may be left uncured (curing failure), which leads to a poorer reliability.

To be more specific, if UV irradiation is performed through the counter substrate 3, portions of the seal pattern which overlap the light shielding layer on the counter substrate 3 are not sufficiently exposed, so that the sealing material may not be sufficiently cured. If UV irradiation is performed through the TFT substrate 1, portions of the seal pattern which overlap the wiring lines that are formed on the TFT substrate 1 are not sufficiently exposed, so that some portions of the sealing material may be left uncured. Furthermore, in the case where spacers (gap material) are contained in the sealing material, regardless of the direction of ultraviolet irradiation, it is difficult to ensure sufficient exposure of the portions of the seal pattern which are shaded by the gap material (which has a relatively large particle size). Thus, if a portion of the sealing material remains uncured, the uncured component of the UV curable resin may elude into the liquid crystal material to cause display defects (blackish stains) which are called "blotting", and ionic components (among others) may blot into the liquid crystal material to cause lowering of the voltage retention rate of the liquid crystal display panel and orientation defects, thus causing "flicker" in the display. Furthermore, the uncured portions in the sealing section 7 may lower the adhesive strength of the sealing section 7, thus allowing voids and/or liquid crystal leakage to occur.

On the other hand, Japanese Laid-Open Patent Publication No. 2000-352717 discloses a structure which includes a UV-reflective layer for reflecting ultraviolet, the UV-reflective layer being provided near the seal pattern on a substrate that opposes the substrate through which ultraviolet rays enter (e.g., the TFT substrate in the case where ultraviolet rays enter through the counter substrate). As a result, ultraviolet is allowed to be uniformly incident on the entire sealing material that constitutes the seal pattern, whereby curing failure can be reduced.

In accordance with the structure disclosed in Japanese Laid-Open Patent Publication No. 2000-352717, supra, the UV curing process for the sealing material can be performed more uniformly and efficiently than conventionally. However, this structure requires a greatly increased number of production steps because of the addition of film formation and patterning steps which are necessary for forming the UV-reflective layer.

Note that, in the case where UV irradiation is to be performed through the counter substrate in the structure disclosed in Japanese Laid-Open Patent Publication No. 2000-352717, the seal pattern is formed outside of the light shielding layer, i.e., so as not to overlap the light shielding layer. Therefore, although the sealing material can be efficiently cured because the entire seal pattern is unshaded by the light shielding layer, the size of the non-display region (frame region) may increase such that the entire display panel becomes large. Moreover, since the sealing section is not shaded by the light shielding layer, the display quality may be deteriorated due to leakage of light.

SUMMARY OF THE INVENTION

The present invention has been made in view of the above problems, and a main objective thereof is to improve the reliability of a sealing section of a display device, while also ensuring excellent display characteristics.

A display device according to the present invention is a display device comprising: a wiring substrate having wiring lines and switching elements thereon; a counter substrate held so as to oppose the wiring substrate; a display medium layer provided between the wiring substrate and the counter substrate; and a sealing section surrounding the display medium layer, the sealing section being formed of a sealing material which contains a photocurable resin, the display device having a display region in which a plurality of pixels are included, wherein, the sealing material contains light-scattering particles for scattering light which cures the photocurable resin; the counter substrate has a light shielding layer thereon, the light shielding layer surrounding the display region; and the sealing section is formed within a region shaded by the light shielding layer.

In an embodiment, the light-scattering particles have an average primary particle size of no less than about 0.001 μm and no more than about 1.000 μm.

The light-scattering particles may comprise metal oxide.

The light-scattering particles may comprise at least one type of metal oxide selected from the group consisting of: zinc oxide; titanium oxide; aluminum oxide; barium sulfate; and iron oxide.

The light-scattering particles may be contained in an amount such that the light-scattering particles account for no less than about 0.1 mass % and no more than about 10.0 mass % of the mass of the photocurable resin.

In an embodiment, the sealing section has a width which is about 80% or less of the width of the light shielding layer.

At least a portion of the sealing section may be located above a wiring line on the wiring substrate.

In an embodiment, the photocurable resin is a UV curable resin, and the light-scattering particles scatter ultraviolet.

The display medium layer may be a liquid crystal layer.

The display device may further comprise: an inlet section formed of the sealing material; and a closing section for closing the inlet section, wherein the liquid crystal layer may be formed within a region which is defined by the sealing section, the inlet section, and the closing section.

According to the present invention, curing failures of a sealing material are suppressed and the reliability of a sealing section can be enhanced. Moreover, since the sealing section is provided in a region that is shaded by a light shielding layer which is provided on a counter substrate, the influence which the sealing section exerts on the displaying is reduced, whereby high display characteristics can be realized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1A is a plan view; and FIG. 1B is a cross-sectional view taken along line Ib-Ib' in FIG. 1A.

FIG. 2A is a plan view; and FIG. 2B is a cross-sectional view taken along line IIb-IIb' in FIG. 2A.

FIGS. 4A and 4B are schematic diagrams illustrating a counter substrate on which a seal pattern has been drawn in an liquid crystal display device according to an example, where: FIG. 4A is a plan view; and FIG. 4B is a cross-sectional view taken along line IVb-IVb' in FIG. 4A.

DETAILED DESCRIPTION OF THE INVENTION

Figure 1A:
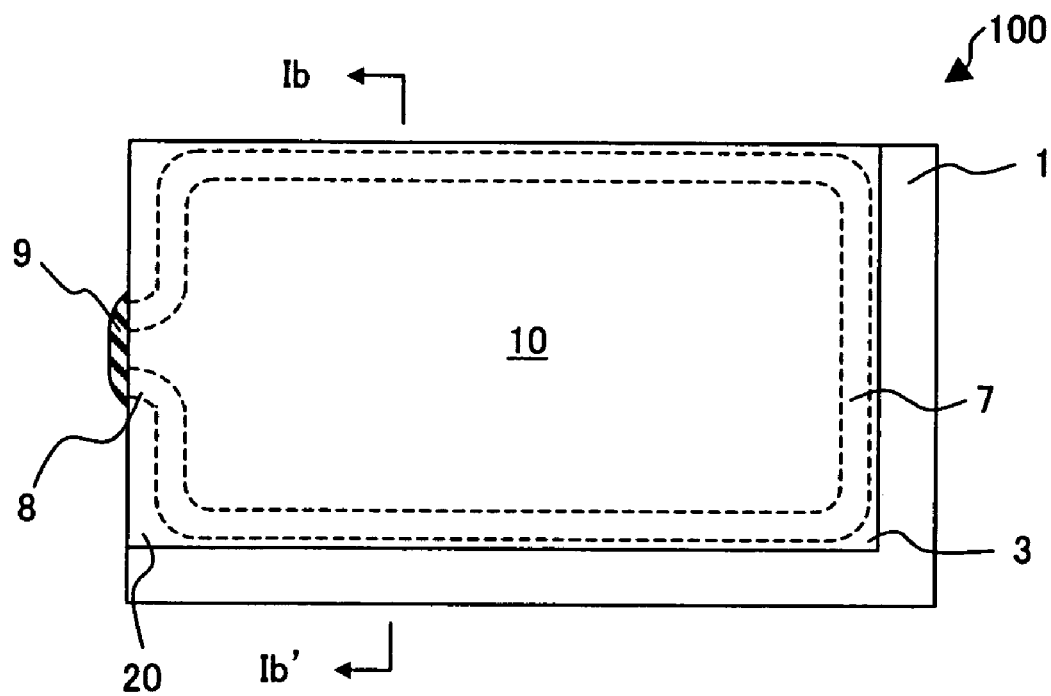
FIGS. 1A and 1B are schematic diagrams illustrating a commonly-used construction of a liquid crystal display device, where.
Figure 1B:
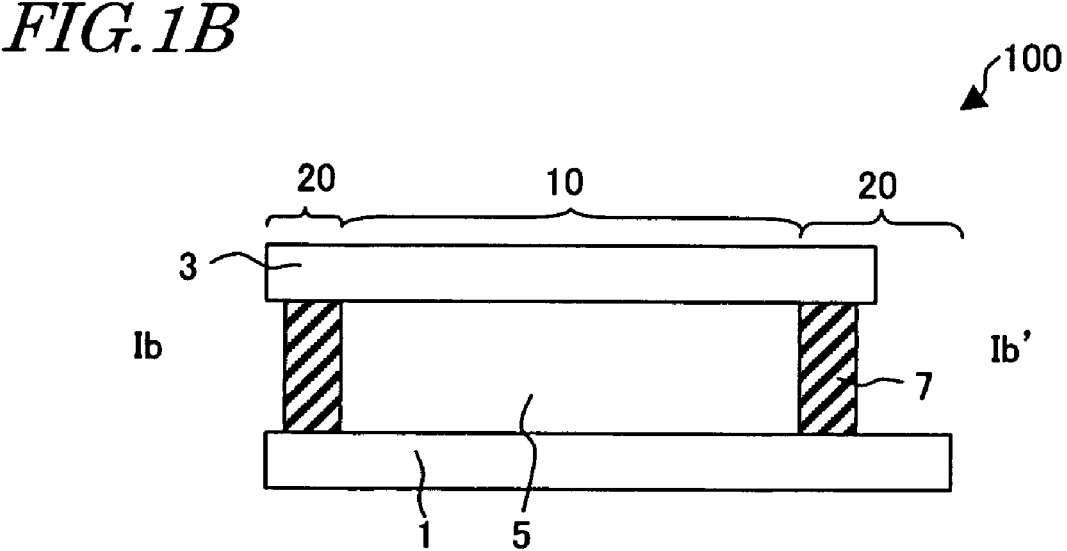
Figure 2A:
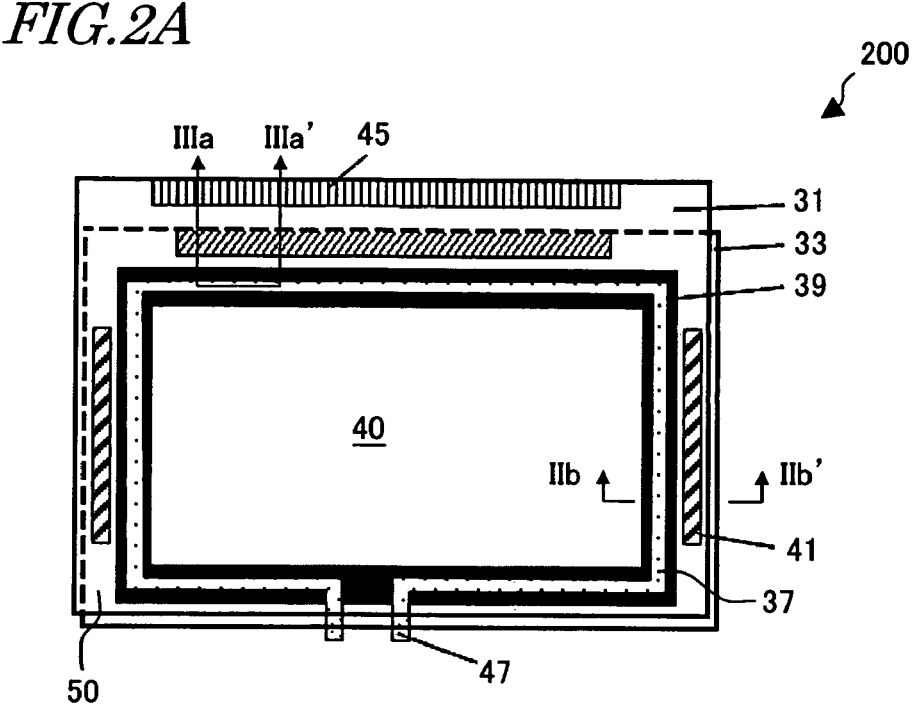
FIGS. 2A and 2B are schematic diagrams showing the construction of a liquid crystal display device according to an embodiment of the present invention, where.
Figure 2B:
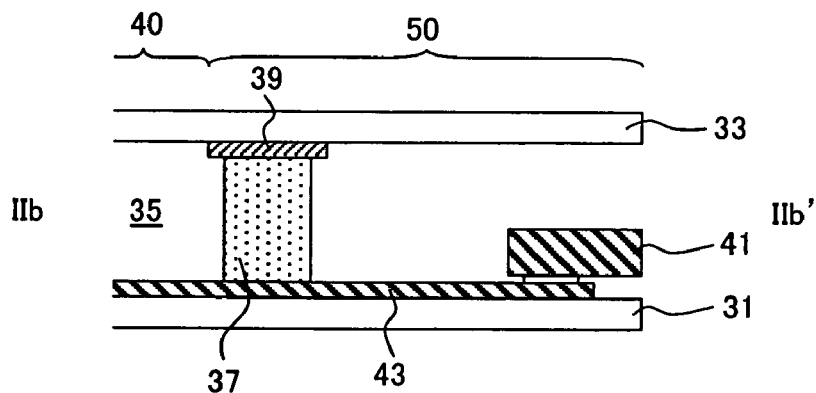

Hereinafter, an embodiment of the display device according to the present invention will be described with reference to the accompanying drawings. The display device of the present embodiment is an active matrix type liquid crystal display device. FIG. 2A is a plan view schematically showing the construction of the display device of the present embodiment. FIG. 2B is a cross-sectional view taken along line IIb-IIb' in FIG. 2A.

As shown in FIGS. 2A and 2B, a display device 200 according to the present embodiment includes: a wiring substrate 31; a counter substrate 33; a liquid crystal layer 35 which is provided between the wiring substrate 31 and the counter substrate 33; and a sealing section 37 which surrounds the liquid crystal layer 35. Note that, for the sealing section 37 to "surround the liquid crystal layer 35" does not necessarily mean that the liquid crystal layer 35 is completely surrounded; rather, as shown in FIGS. 2A and 2B, the sealing section 37 may have an opening for allowing a liquid crystal material to be injected therethrough. Furthermore, the display device 200 includes a display region 40 and a non-display region 50 around the display region 40.

In the present embodiment, a TFT substrate is used as the wiring substrate 31. In the display region 40 of the wiring substrate 31, a plurality of TFTs and pixel electrodes (neither of which is shown) are provided. In the non-display region 50 of the wiring substrate 31, the following elements are formed: driver circuitry 41 for driving the TFTs; wiring lines 43 for connecting the TFTs to the driver circuitry 41; and electrodes for external connection 45, which are used for supplying a predetermined signal power to the driver circuitry 41.

In the display region 40 of the counter substrate 33, a color filter layer and a counter electrode (not shown) opposing the pixel electrode are provided. In the non-display region 50 of the counter substrate 33, a light shielding layer 39 is formed. The light shielding layer 39 is provided in the non-display region 50 but adjacent the display region, and defines the outer contour of the display region 40.

The wiring substrate 31 and the counter substrate 33 are attached together by the sealing section 37 and an inlet section 47, both of which are provided in the non-display region 50. The sealing section 37 extends along the outer contour of the display region 40, while remaining within a region which is shaded by the light shielding layer 39. In FIG. 2A, it will be seen that the narrower sealing section 37 (shown as a dotted area) is overlying the broader light shielding layer 39 (shown as a broad black stripe). The sealing section 37 has a width which is smaller than the width of the light shielding layer 39, e.g., about 80% or less of the width of the light shielding layer 39. The sealing section 37 has an opening, through which a liquid crystal material is to be injected into the region surrounded by the sealing section 37. The inlet section 47 extends from the opening of the sealing section 37 toward an edge of the substrate. In the present embodiment, only the sealing section 37 needs to be formed within the region shaded by the light shielding layer 39, whereas the inlet section 47 does not need to be formed within the region shaded by the light shielding layer 39. Although not shown in FIG. 2A, wiring lines 43 (FIG. 2B) are formed on the wiring substrate 31, so as to extend from the driver circuitry 41 to the display region 40 while traversing the sealing section 37. As a result, as shown in FIG. 2B, the sealing section 37 partially overlaps the wiring lines 43 on the wiring substrate 31. Although not shown, the inlet section 47 is closed with a closing material.

The sealing section 37 and the inlet section 47 are formed by using a UV curable type sealing material which contains a UV curable resin as an adhesive agent. Commonly-used UV curable type sealing materials that are used in conventional display devices contain a UV curable resin (e.g., an acrylic resin), electrically-conductive particles, and a gap material for retaining a gap (cell gap) between the substrates. In addition to these components, the UV curable type sealing material according to the present embodiment also contains UV-scattering particles for promoting curing of the sealing material. As a result, the sealing section 37 achieves a high reliability with a reduced curing failure, as will be specifically described later.

The sealing section 37 of the present embodiment may be formed by the following method, for example. First, circuit elements (e.g., electrodes and wiring lines), the light shielding layer 39, alignment films, and the like are formed on the wiring substrate 31 and the counter substrate 33. Thereafter, on one of these substrates, a seal pattern is drawn by using the aforementioned sealing material. In the present embodiment, the seal pattern is drawn so as to define a region in which the liquid crystal layer is to be formed (i.e., a region containing the display region), and also to have the inlet section 47. Next, after the wiring substrate 31 and the counter substrate 33 are attached together, UV irradiation is performed to cure the sealing material.

Figure 3:
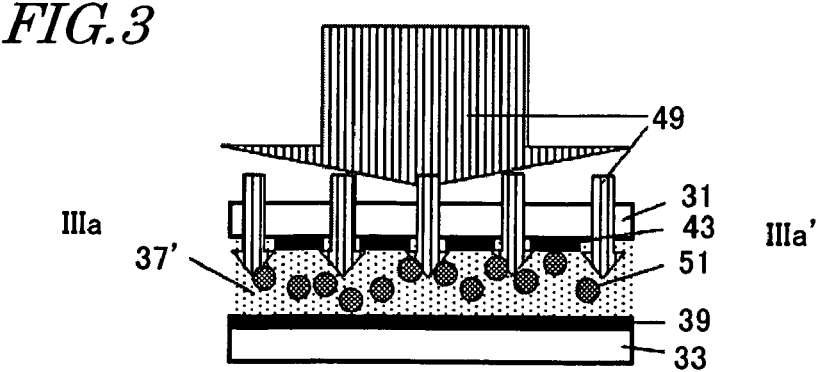
FIG. 3 is an enlarged schematic cross-sectional view for explaining a process of curing a sealing material in an embodiment of the present invention.

FIG. 3 is an enlarged cross-sectional view, taken along line IIIa-IIIa' in FIG. 2A, for explaining a curing process by UV irradiation. In this process, as shown, the seal pattern 37' which is formed of a sealing material is irradiated with ultraviolet 49 through the wiring substrate 31. A plurality of UV-scattering particles 51 are generally uniformly dispersed in the sealing material. In the seal pattern 37', any portion (shaded portion) that is shaded by the wiring lines 43 on the wiring substrate 31 does not receive direct irradiation of ultraviolet 49 through the wiring substrate 31. However, portions of the ultraviolet 49 entering those portions of the seal pattern 37' which are not shaded by the wiring lines 43 strike the surface of the UV-scattering particles 51 contained in the sealing material and are scattered thereby, thus entering the shaded portions. As a result, a sufficient UV irradiation takes place also for the shaded portions in the seal pattern 37'. Therefore, the sealing material can be cured uniformly and efficiently, and the sealing section 37 attains good curing characteristics.

As described above, in the liquid crystal display device 200, the sealing section 37 is formed by using a sealing material which contains the UV-scattering particles 51. Therefore, curing failures (i.e., portions of the sealing material remaining uncured) can be suppressed. Thus, deteriorations in display characteristics and reliability that are associated with curing failures of the sealing material can be prevented.

Moreover, in Japanese Laid-Open Patent Publication No. 2000-352717, supra, it is necessary to form a UV-reflective layer in order to ensure that ultraviolet permeates the entire seal pattern, thus resulting in a problem of an increase in the number of production steps. On the other hand, according to the present embodiment, it is only necessary to use a sealing material in which the UV-scattering particles 51 are dispersed. Therefore, a highly reliable display device can be provided without complicating its production process.

Furthermore, since the portion of the seal pattern which serves as the sealing section (i.e., the portion other than the portion to become the inlet section) is located within the region which is shaded by the light shielding layer 39, deteriorations of the display characteristics due to an increase in the non-display region and associated with the sealing section 37 can be suppressed. Moreover, since UV irradiation is performed through the wiring substrate 31 in the present embodiment, the curing process is not unfavorably affected even if the surface of the sealing section 37 facing the counter substrate is covered by the light shielding layer 39.

In the present embodiment, after the sealing section 37 is formed through the above-described method, a liquid crystal material is vacuum-injected into the space between the wiring substrate 31 and the counter substrate 33, through the inlet section 47. After the vacuum injection, the inlet section 47 is closed with a closing material, whereby the liquid crystal layer 35 is formed between the wiring substrate 31 and the counter substrate 33. Such a method of forming the liquid crystal layer 35 is called a vacuum injection technique.

Instead of using a vacuum injection technique, a one drop filling technique may be used to form the liquid crystal layer. Using a one drop filling technique, the liquid crystal layer 35 may be formed as follows. First, a seal pattern is drawn on one of the substrates by using a sealing material, and thereafter a liquid crystal material is dropped into the region which is surrounded by the seal pattern. Next, this substrate is attached to the other substrate, and the sealing material is cured. Thus, in the case where a one drop filling technique is used, it is not necessary to provide an inlet section through which to inject a liquid crystal material, and therefore the sealing section may be formed so as to completely surround the display region along the outer contour of the display region. In this case, too, the sealing section is to be located within the region which is shaded by the light shielding layer on the counter substrate.

Next, the UV-scattering particles 51 according to the present embodiment will be described.

The UV-scattering particles 51 to be added to the sealing material should be able to cause scattering or diffuse-reflection of ultraviolet at the surface (i.e., the boundary between the UV-scattering particles 51 and the sealing material). It is preferable that the UV-scattering particles 51 are transparent with respect to ultraviolet in order to suppress any decrease in the ultraviolet intensity caused by scattering or diffuse-reflection. Although there are no particular limitations as to the material of the UV-scattering particles 51, metal oxide microparticles may be used, e.g., titanium oxide, zinc oxide, cerium oxide, aluminum oxide, barium sulfate, or iron oxide, for example. In order to provide an improved wettability with respect to the resin that composes the sealing material, the surface of such metal oxide microparticles may be treated with an organic compound, e.g., phosphate. Alternatively, particles of organic material (e.g., an organic titanium compound) whose surface have been treated so as to have UV scattering characteristics may be used. The UV-scattering particles 51 should contain at least one type of particles, and may contain a plurality of types of particles composed of different materials. Although there are no limitations as to the shape of the UV-scattering particles 51, they may be spherical, for example. The particle size of the UV-scattering particles 51 (average primary particle size) is about 0.001 μm or more, although it may be appropriately selected according to the type of the UV curable resin or the like. In order to cause scattering of light of the wavelength to be scattered, it is desirable that the particle size of the UV-scattering particles 51 is on the order of that wavelength. However, microparticles of any smaller particle size may form aggregations in various units and form secondary particles, and if the average secondary particle size is on the order of the scattering wavelength, a sufficient UV scattering effect can be obtained such that the ultraviolet which is necessary for curing the photocurable resin can be scattered, rather than allowing the ultraviolet to be shaded. On the other hand, if the particle size is too large, the adhesive strength of the sealing section 37 will be lowered, and therefore it is preferable that the particle size is about 1.0 μm or less. More preferably, the particle size of the UV-scattering particles 51 is no less than 0.2 μm and no more than 0.4 μm. Furthermore, it is preferable that the UV-scattering particles 51 are contained in an amount such that they account for about 0.1 mass % or more relative to the mass of the UV curable resin which is contained in the sealing material. When the UV-scattering particles 51 are contained in an amount such that they account for about 0.1 mass % or more, the sealing material which is located in the shaded portions of the seal pattern 37' can be more reliably cured by the scattered light from the UV-scattering particles 51. On the other hand, if the amount of the UV-scattering particles 51 is too large, the adhesive strength of the sealing section 37 may decrease. Therefore, it is preferable that the UV-scattering particles 51 are contained in an amount such that they account for 10.0 mass % or less relative to the mass of the UV curable resin which is contained in the sealing material.

As the UV curable resin to be contained in the sealing material according to the present embodiment, an acrylic resin, an epoxy resin, or a mixture of these resins may be used. In the sealing material, electrically-conductive particles such as gold pearls and/or a gap material may also be dispersed in addition to the UV-scattering particles 51. In the case of using a sealing material in which a gap material is dispersed, relatively large particles of the gap material (e.g., particle size of 5.0 μm) may result in some portions of the seal pattern 37' being shaded by the gap material when performing UV irradiation. However, such shaded portions will also be irradiated with scattered light from the UV-scattering particles 51, so that uneven curing can be prevented.

As the sealing material according to the present invention, not only a UV curable type sealing material, but also a sealing material which contains as an adhesive agent a photocurable resin that is cured by light of any other wavelength (e.g., visible light) may also be used. Note that the term "photocurable resin" refers to any resin that undergoes a curing reaction when being irradiated with light of a predetermined wavelength, and encompasses those resins which further accept thermosetting after photocuring. By relying also on thermosetting, the physical characteristics of the cured substance (e.g., hardness and elastic modulus) are generally improved. In the case of using a sealing material which contains a photocurable resin other than a UV curable resin, the same effect of uniformly curing the sealing material as in the above-described embodiment can be obtained by adding, to the sealing material, light-scattering particles which cause scattering or diffuse-reflection of light of the wavelength that causes curing of the photocurable resin.

It is desirable that there is a distance or 500 μm or more between the outer contour of the display region 40 and the sealing section 37. As a result, deterioration of the display characteristics due to components of the sealing material blotting into the display region from the sealing section 37 can be prevented.

Although a TFT substrate is used as the wiring substrate 31 in the present embodiment, the wiring substrate 31 may be any substrate having switching elements and wiring lines formed thereon. For example, a wiring substrate having non-linear 2-terminal devices such as MIM (metal-insulator-metal) devices formed thereon may be used. Moreover, although peripheral circuitry such as the driver circuitry 41 is formed on the wiring substrate 31 in the present embodiment (thus realizing a monolithic construction), it is not necessary for the peripheral circuitry to be formed on the wiring substrate 31.

Although the present invention has been exemplified above with respect to a liquid crystal display device which includes a liquid crystal layer as a display medium layer, the present invention may suitably be used for various other display devices, without being limited thereto. For example, the present invention may be suitably used for a display device which includes an electrophoresis layer or an organic EL layer as its display medium layer.

EXAMPLE

Hereinafter, an example of the display device according to the present invention will be described. The display device of the present example is an active matrix type liquid crystal display device which has a construction similar to the construction that has been described with reference to FIGS. 2A and 2B above.

A sealing material and a method for producing a display device according to the present example will be described below.

An acrylic-modified epoxy resin was used as the UV curable resin, and titanium oxide particles (average primary particle size: 0.35 μm) were added as UV-scattering particles. It is preferable to perform, in advance, an aggregation prevention treatment for the titanium oxide particles in order to enhance the dispersion effect and UV diffusing effect on the UV curable resin. Therefore, in the present example, the titanium oxide particles were subjected to an aggregation prevention treatment by a method similar to a treatment method which is disclosed in Japanese Laid-Open Patent Publication No. 5-70129. The titanium oxide particles were added in an amount of 0.3 wt % based on the weight of the UV curable resin. Note that the amount to be contained, material, particle size, etc., of the UV-scattering particles are not limited thereto, but may be appropriately selected in accordance with the optimum curing wavelength of the UV curable resin used in the sealing material. In the UV curable resin, gold pearls (average particle size: 5.5 μm) for common transfer were further added in an amount of 0.1 wt % as electrically-conductive particles, and silica microparticles (average particle size: 5.0 μm) were further added in an amount of 1.0 wt % as a gap material.

Next, the UV curable resin to which the titanium oxide particles, the electrically-conductive particles, and the gap material had been added was introduced into a agitator (manufactured by EME K.K.), and subjected to agitation in a vacuum for 5 minutes under the conditions of: a rotation 500 rpm of and a revolution of 1500 rpm, whereby the sealing material was obtained. Then, the sealing material was transferred from the agitator into a syringe, and the sealing material was subjected to agitation and degassing within the syringe.

Thereafter, by using a dispenser, a seal pattern was drawn on the counter substrate using the sealing material. A plan view of the counter substrate on which the seal pattern has been drawn is shown in FIG. 4A, and a cross-sectional view along line IVb-IVb' in FIG. 4A is shown in FIG. 4B. In these figures, for simplicity, those component elements which also appear in the liquid crystal display device 200 shown in FIGS. 2A and 2B are denoted by like reference numerals.

As shown, on the counter substrate 33 on which the light shielding layer (width: 2.0 mm) 39 is formed so as to define the display region 40, the sealing material is applied in a predetermined seal pattern (width: 1.5 mm) 37'. Specifically, the sealing material is applied on the light shielding layer 39 so as to surround the display region 40, thus constituting a portion of the seal pattern 37' to become the sealing section, and applied from over the light shielding layer 39 toward an edge of the substrate, thus forming a portion to become the inlet section.

Next, the counter substrate 33 on which the seal pattern 37' had been drawn was attached to the wiring substrate 31 on which pixel electrodes, alignment films, and the like had been formed. Thereafter, the seal pattern 37' was subjected to UV irradiation through the wiring substrate, thereby forming the sealing section and the inlet section. In the present example, the irradiation intensity during the UV irradiation was 0.2 W/cm² (wavelength: 365 nm), and the irradiation time was 120 seconds. Note that, although the irradiation conditions may be appropriately selected in accordance with the constitution of the sealing material and the width, shape, etc., of the seal pattern 37', the UV-scattering particles help to realize a UV irradiation which is more efficient than conventional. Therefore, it is possible to reduce the irradiation time, and/or reduce the irradiation intensity from the conventional levels. This provides an advantage of reducing the damage to the TFTs on the wiring substrate which is caused by UV irradiation.

Then, via the inlet section, a liquid crystal material was vacuum-injected into the region surrounded by the sealing section, and thereafter the inlet section was closed with a closing material, whereby a liquid crystal layer was formed between the counter substrate 33 and the wiring substrate 31. Thus, the liquid crystal display device of the present example was accomplished.

Next, results of a reliability test which was performed for the liquid crystal display device of the present example are described.

In the reliability test, the liquid crystal display device of the present example was allowed to operate for 500 hours under a high temperature-high humidity condition (60° C., 90%). No deteriorations in the display characteristics and no changes in the electrical characteristics (e.g., flickering and blotting) ascribable to curing failures of the sealing material were observed, thus indicating the sufficient reliability of this liquid crystal display device.

According to the present invention, the reliability of a sealing section can be improved while reducing the influence on the display characteristics that is exerted by the sealing section. As a result, a highly reliable display device which has excellent display characteristics can be provided.

The present invention is suitably used in various display devices including liquid crystal display devices, electrophoresis display devices, and organic EL display devices. In particular, the present invention can be advantageously used in small-sized image display devices whose wiring pattern is made smaller and smaller.

While the present invention has been described with respect to the embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on patent application No. 2006-010042 filed in Japan on Jan. 18, 2006, the entire contents of which are hereby incorporated by reference.

What is claimed is:

1. A display device, comprising:
    a wiring substrate having wiring lines and switching elements thereon;
    a counter substrate held so as to oppose the wiring substrate;
    a display medium layer provided between the wiring substrate and the counter substrate; and
    a sealing section surrounding the display medium layer, the sealing section being formed of a sealing material which contains a photocurable resin,
    the display device having a display region in which a plurality of pixels are included, wherein,
    the sealing material contains light-scattering particles for scattering light which cures the photocurable resin;
    the counter substrate has a light shielding layer thereon, the light shielding layer surrounding the display region; and
    the sealing section is formed within a region shaded by the light shielding layer,
    wherein the light-scattering particles are contained in an amount such that the light-scattering particles account for no less than about 0.1 mass % and no more than about 10.0 mass % of the mass of the photocurable resin.

2. The display device of claim 1, wherein the light-scattering particles have an average primary particle size of no less than about 0.001 μm and no more than about 1.000 μm.

3. The display device of claim 1, wherein the light-scattering particles comprise metal oxide.

4. The display device of claim 1, wherein the light-scattering particles comprise at least one type of metal oxide selected from the group consisting of: zinc oxide; titanium oxide; aluminum oxide; barium sulfate; and iron oxide.

5. The display device of claim 1, wherein the sealing section has a width which is about 80% or less of the width of the light shielding layer.

6. The display device of claim 1, wherein at least a portion of the sealing section is located above the wiring lines on the wiring substrate.

7. The display device of claim 1, wherein the photocurable resin is a UV curable resin, and the light-scattering particles scatter ultraviolet.

8. The display device of claim 1, wherein the display medium layer is a liquid crystal layer.

9. The display device of claim 8, further comprising:
    an inlet section formed of the sealing material; and
    a closing section for closing the inlet section, wherein the liquid crystal layer is formed within a region which is defined by the sealing section, the inlet section, and the closing section.

10. The display device of claim 1, wherein a surface of the light-scattering particles is treated with an organic compound.

11. The display device of claim 10, wherein the organic the compound includes phosphate.

12. The display device of claim 1, wherein the sealing material further contains a gap material.

* * * * *